(12) United States Patent
Contoret

(10) Patent No.: US 8,894,015 B2
(45) Date of Patent: Nov. 25, 2014

(54) APPARATUS AND METHOD FOR PARAGLIDERS

(71) Applicant: Dreamscience Propulsion Limited, Staffordshire (GB)

(72) Inventor: Adam Edward Alexander Contoret, Hull (GB)

(73) Assignee: Dreamscience Propulsion Limited, Staffordshire (GB)

( * ) Notice: Subject to any disclaimer, the term of this patent is extended or adjusted under 35 U.S.C. 154(b) by 50 days.

(21) Appl. No.: 13/719,108

(22) Filed: Dec. 18, 2012

(65) Prior Publication Data

US 2013/0161451 A1    Jun. 27, 2013

(30) Foreign Application Priority Data

Dec. 23, 2011 (GB) .................................. 1122281.7

(51) Int. Cl.

| | | |
|---|---|---|
| *B64D 17/22* | (2006.01) | |
| *B64D 17/30* | (2006.01) | |
| *B64D 17/36* | (2006.01) | |
| *B64C 39/02* | (2006.01) | |
| *B64C 31/028* | (2006.01) | |
| *B64C 31/036* | (2006.01) | |

(52) U.S. Cl.
CPC .............. *B64C 39/026* (2013.01); *B64C 31/028* (2013.01); *B64D 17/30* (2013.01); *B64C 31/036* (2013.01); *Y10S 244/903* (2013.01)
USPC ........................................ 244/151 R; 244/903

(58) Field of Classification Search
CPC ...... F01D 25/28; F04D 25/084; B64C 39/026; B64C 31/028; B64C 31/024; B64C 31/036; B64C 2031/00; B64D 17/34
USPC .......... 415/213.1; 416/63; 244/4 A, 63, 73 R, 244/903, 900, 151 A, 151 R, 152, 155 A, 244/155 R
See application file for complete search history.

(56) References Cited

U.S. PATENT DOCUMENTS

| | | | |
|---|---|---|---|
| 1,240,669 A * | 9/1917 | Capps ........................... | 244/4 A |
| 2,456,440 A * | 12/1948 | Morrill ......................... | 180/313 |
| 3,149,798 A * | 9/1964 | Moore .......................... | 244/4 A |
| 3,381,917 A * | 5/1968 | Moore et al. .................. | 244/4 A |
| D243,594 S * | 3/1977 | Koch ........................... | D12/321 |

(Continued)

FOREIGN PATENT DOCUMENTS

| | | |
|---|---|---|
| FR | 2667568 A1 | 4/1992 |
| JP | 4092798 | 3/1992 |
| WO | WO2007/073361 A1 | 6/2007 |
| WO | WO2013/093447 A1 | 6/2013 |

OTHER PUBLICATIONS

International Search Report and Written Opinion of the International Searching Authority, mailed May 17, 2013, for corresponding International Application No. PCT/GB2012/053172, 9 pages.

*Primary Examiner* — Philip J Bonzell

(74) *Attorney, Agent, or Firm* — Klarquist Sparkman, LLP

(57) ABSTRACT

Apparatus and method for propelling a user wearing paragliding equipment are disclosed The apparatus includes at least one thruster for providing thrust in a predetermined direction; and an attachment element for attaching the at least one thruster to a user's body such that the thruster is secured against the front portion of the user's body.

19 Claims, 5 Drawing Sheets

(56) References Cited

U.S. PATENT DOCUMENTS

| | | | | |
|---|---|---|---|---|
| 4,040,577 | A | * | 8/1977 | Moore .......................... 244/4 A |
| 4,189,019 | A | * | 2/1980 | Zech ............................ 180/182 |
| 5,222,569 | A | * | 6/1993 | Martel .......................... 180/180 |
| 7,331,833 | B2 | * | 2/2008 | Burgess, Jr. ..................... 440/37 |
| 7,690,958 | B2 | * | 4/2010 | Burgess, Jr. ..................... 440/37 |
| 8,104,718 | B2 | * | 1/2012 | Shaw ............................ 244/139 |
| 8,292,678 | B2 | * | 10/2012 | Burgess, Jr. ..................... 440/37 |
| 8,561,936 | B2 | * | 10/2013 | Matte ............................ 244/16 |
| 2008/0290616 | A1 | * | 11/2008 | Burgess, Jr. ...................... 280/1 |
| 2009/0108135 | A1 | * | 4/2009 | Shaw ........................ 244/158.3 |
| 2012/0020790 | A1 | * | 1/2012 | Burgess, Jr. ..................... 416/63 |

\* cited by examiner

APPARATUS AND METHOD FOR PARAGLIDERS

CROSS-REFERENCE TO RELATED APPLICATION

This application claims priority to and the benefit of Great Britain Application No. GB1122281.7, which was filed on Dec. 23, 2011, and is incorporated herein by reference in its entirety.

FIELD

The present invention relates to an apparatus and method for paragliders. In particular, but not exclusively, the present invention relates to an improved means of propulsion for use by an individual when engaging in paragliding, powered paragliding, paramotoring, hang gliding, and other similar sporting activities.

BACKGROUND

Paragliding equipment in general is well known and generally includes a harness section that a user secures to his body with loops and restraints to enable the user to be comfortably suspended in flight and move relatively freely, and a wing section (canopy) of fabric designed to act as an aerofoil for slowing the rate of fall of a user and for capturing lift from thermal air movement. In use, the user is suspended below the canopy via suspension wires.

Powered paragliding or paramotoring is also known, in which a paraglider mounts an engine or electric power source to his or her back to add power to the paragliding activity.

JP4092798 discloses such type of powered device.

SUMMARY

According to a first aspect of the present disclosure there is provided apparatus for propelling a user wearing paragliding equipment, comprising:

at least one thruster for providing thrust in a predetermined direction; and an attachment element for attaching the at least one thruster to a user's body such that the thruster is secured against the front portion of the user's body.

According to a second aspect of the present disclosure there is provided a kit of parts comprising apparatus as defined in the first aspect of the disclosure and a harness element and a fabric wing member.

According to a third aspect of the present disclosure there is provided a method of propelling a user over land or water, comprising providing an apparatus as defined in the first aspect of the disclosure, providing a harness and a fabric wind member, and causing the at least one thruster to move air to thereby propel the user.

Aptly, the apparatus comprises two thrusters. This may help to balance the apparatus when attached to a user.

Aptly, the thrusters are provided at opposed ends of a rigid member, and the thrusters are attached to the user's body via the rigid member.

In some preferred embodiments the attachment element comprises a harness or belt.

Aptly, the attachment element further comprises a connector for connecting the harness or belt to the rigid member.

Aptly, the attachment element is arranged to provide attachment of the at least one thruster to the user's body in the region of the user's hips. With this arrangement, the user is allowed a high freedom of movement, including both a sitting position and a standing position.

Aptly, the at least one thruster comprises a housing and an air moving device mounted within the housing.

Aptly the apparatus further comprises a control device for adjusting the speed of the at least one thruster. This helps to enhance the user experience and may also act as a safety feature for giving increased controllability over the equipment.

In some preferred embodiments the control device is a hand-held unit. The user may be able to conveniently control wires of the paragliding unit as well as the speed of the thruster with a single hand.

Aptly, the control device comprises a user input means for the user to start, stop, increase and/or decrease the speed of the at least one thruster.

Aptly the apparatus further comprises a further control device for adjusting an angle of thrust provided by the at least one thruster. Again, this helps to enhance the user experience and controllability over the equipment.

Aptly, the further control device is a hand-held unit.

Aptly, the further control device comprises a further user input means for the user to change the angle of thrust of the at least one thruster.

Aptly the apparatus may further comprise at least one weighting element operably connected to the at least one thruster for influencing the direction of thrust provided by the at least one thruster.

BRIEF DESCRIPTION OF THE DRAWINGS

For a better understanding of the invention and to show how the same may be carried into effect, reference will be made, by way of example only, to the following drawings, in which.

DETAILED DESCRIPTION

Figure 1A:
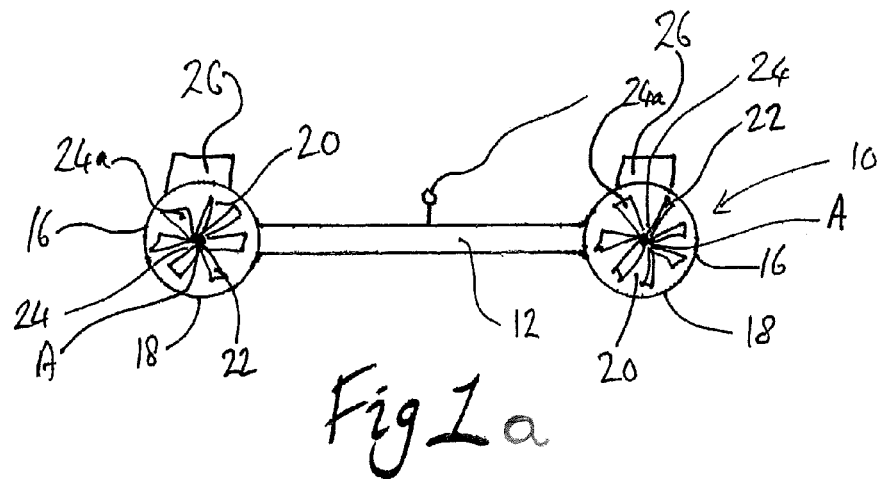
FIGS. 1a and 1b are sketches showing schematically a front view of an apparatus according to one embodiment.
Figure 1B:
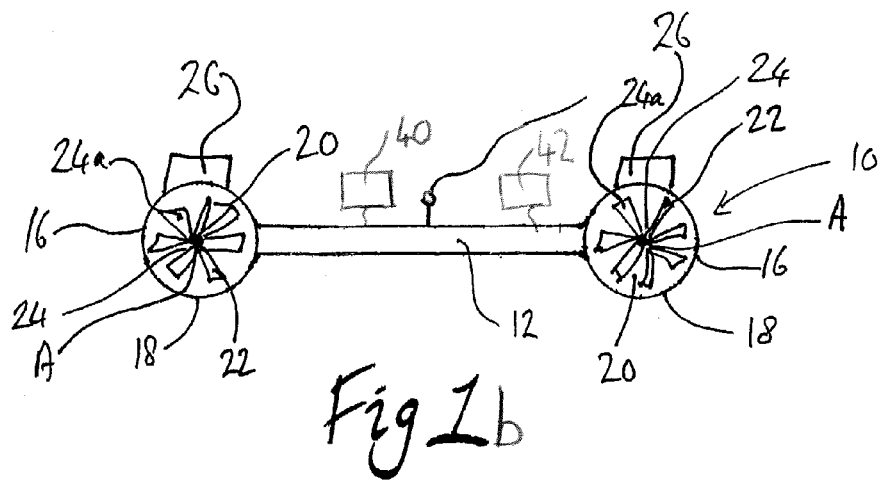
Figure 2:
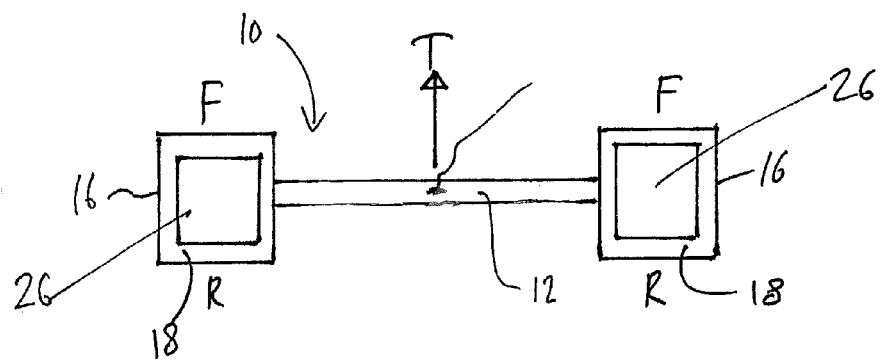
FIG. 2 is a sketch showing schematically a top plan view of an apparatus according to one embodiment.
Figure 3:
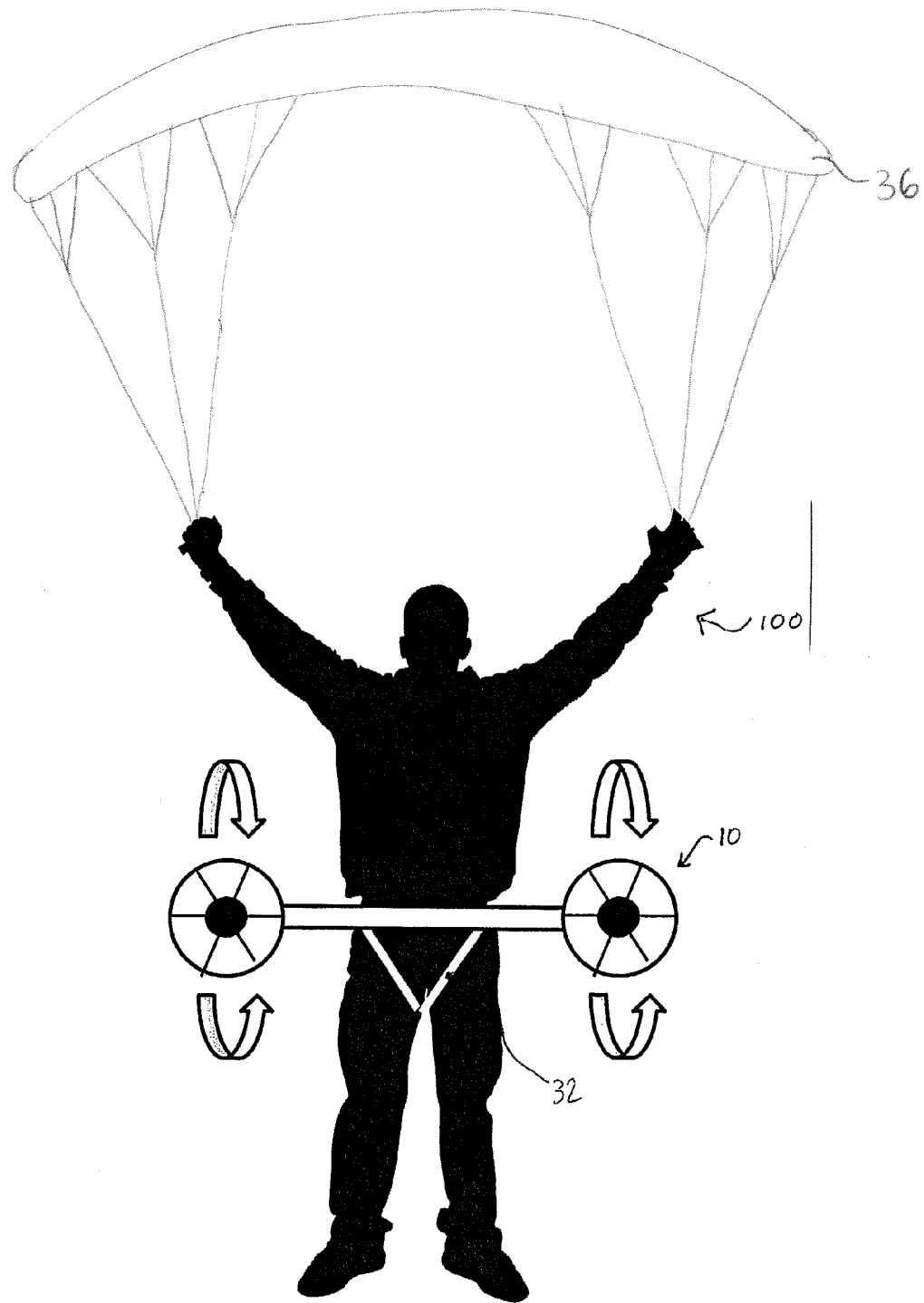
FIG. 3 is an image showing a typical user wearing an exemplary apparatus.
Figure 4:
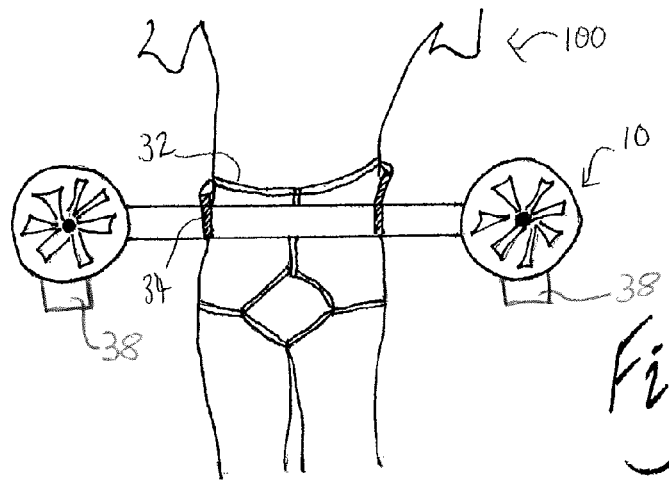
FIG. 4 is a sketch showing schematically an exemplary apparatus.
Figure 5:
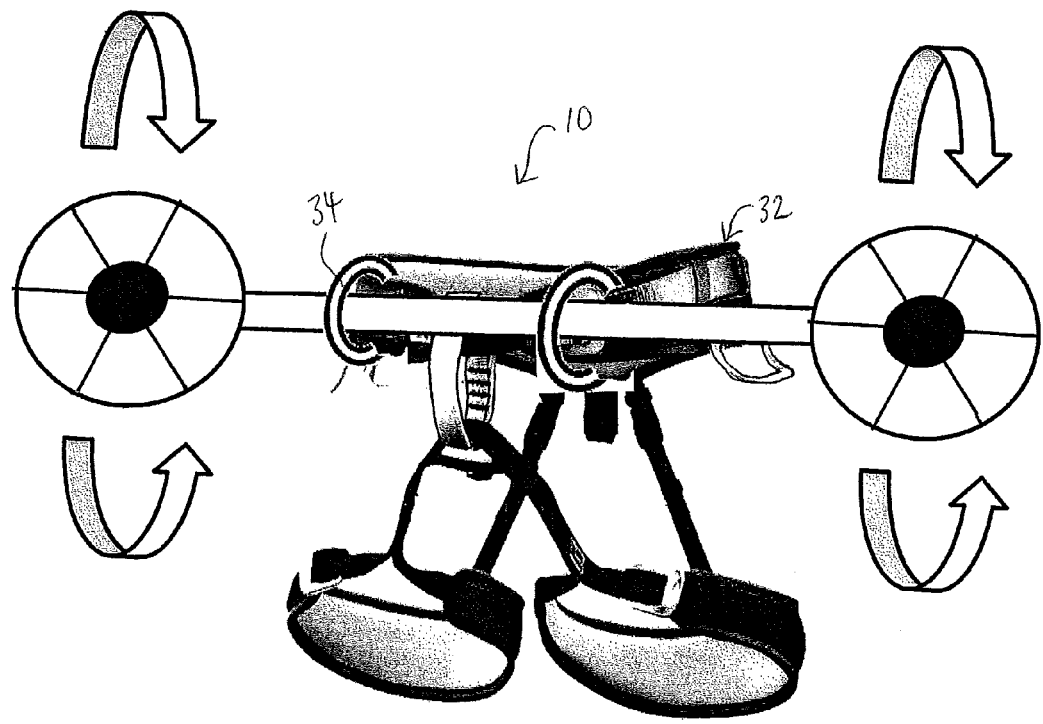
FIG. 5 is an image showing the apparatus of FIG. 4 in more detail.
Figure 6:
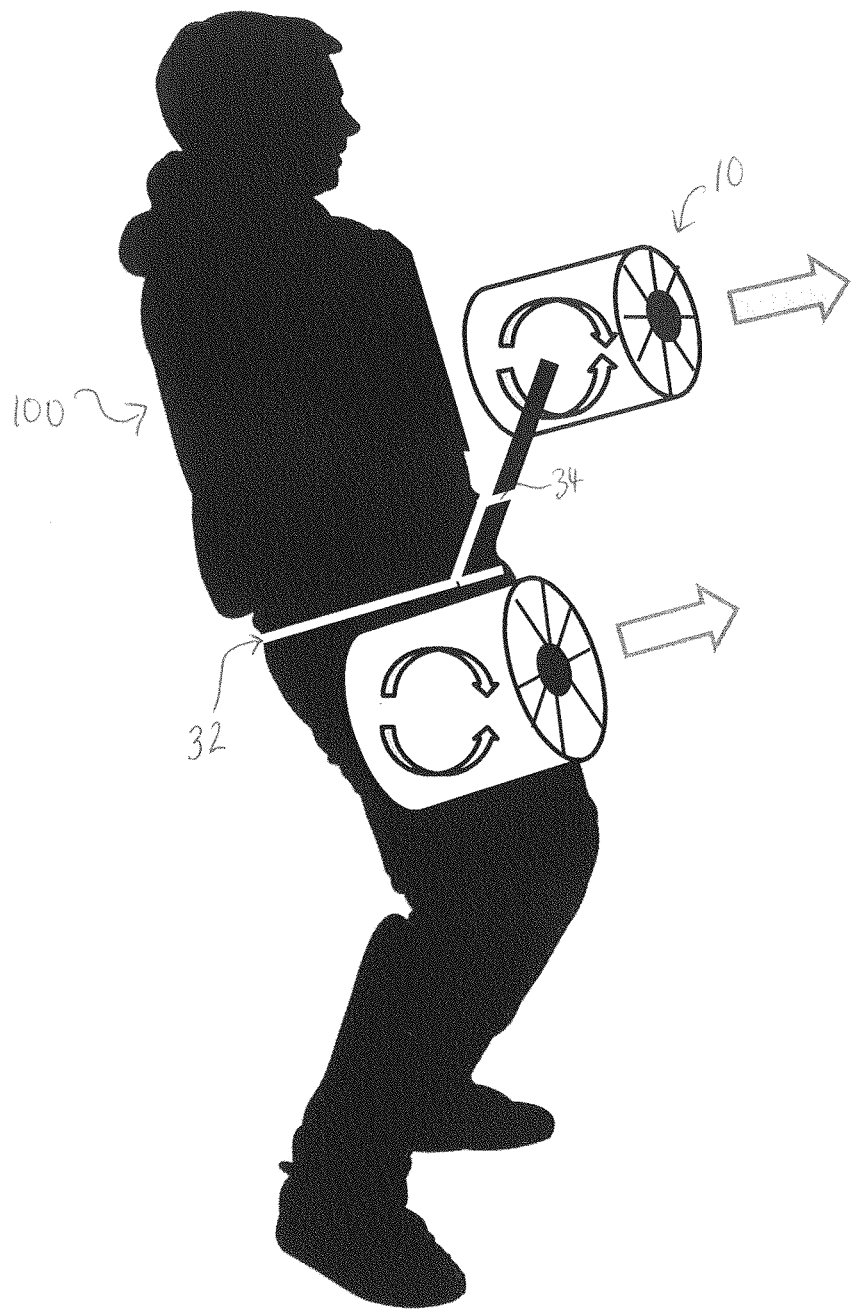
FIG. 6 is an image showing a typical user wearing an exemplary apparatus.

According to an embodiment of the present invention, as shown in FIGS. 1 and 2, apparatus 10 comprises a rigid member 12 which is typically a bar or tube made from a lightweight material. Suitably, the rigid member 12 is made from a lightweight metal or a suitably strong plastic or plastics composite material. In some preferred forms, the rigid member 12 is straight (i.e. rectilinear). However, in particular embodiments, the rigid member 12 may be curved, or include curves, for example to provide gripping portions which facilitate the holding of the rigid member 12 in a user's hands. Such gripping portions may, for example have a surface comprising a high friction material, for example a rubbery material, on which a user can maintain a strong and comfortable grip.

At respective opposed ends of the rigid member 12 is mounted a thruster 16. That is, each end of the rigid member 12 carries a thruster 16. Any suitable means known in the art may be used to attach the thrusters 16 to the respective ends of the rigid member 12, for example by means of mechanical fastening means, for example clips or bolts, or by suitably strong adhesive, or by welding. The thrusters 16 are operably connected to the rigid member 12 and may be fixedly attached to the rigid member 12 or moveably attached to the rigid member 12, for example. In other embodiments, the apparatus may include only one thrusters (e.g. mounted centrally to the user), or may include any other number of thrusters.

Each thruster 16 comprises a housing 18 which is attached to the respective end of the rigid member 12. The housing 18 defines a channel or passage 20 that defines an air flow pathway through the housing.

Associated with each passage 20 is an air moving means 22. Preferably the air moving means 22 comprises a fan or propeller 24 with a plurality of air-moving blades 24a. Preferably the air moving means is mounted with the passage 20. Air moving means 22 is configured to cause, in operation, a flow of air through the passage 20 from the front side F to the rear side R of the apparatus. The movement of air through the passage 20 by the air moving means 22 is sufficient to provide a forward thrust (that is, generally in the direction of arrow T) to the apparatus 10.

The housing 18 also provides protection against a rotor failure by the air moving means 22.

Air moving means 22 will, in preferred embodiments, cause movement of air through passage 22 by rotation of a fan or propeller about an axis A, extending perpendicular to the plane of the page in FIG. 1, that is, from the front to the back of the housing. The axis A will normally be arranged substantially centrally with respect to the passage 20.

A drive means or arrangement is provided to cause rotation of the fan or propeller about axis A. Preferred drive means is an electric motor. A single electric motor may be provided to drive the air moving means 22 of both thrusters 16, for example by way of drive belts or drive shaft. In this case, the motor may conveniently be mounted on the rigid member 12, approximately equidistantly from the respective thrusters 16. In preferred arrangements, however, each air moving means 22 has an associated electric motor which is preferably arranged co-axially with the air moving means (that is, co-axially with the fan or propeller 24, in preferred embodiments). In some preferred embodiments, the electric motor is coupled directly to the fan or propeller 24 without any intervening gearing or linkage.

The rotation of the fan or propeller about the axis A may be in the region of 10,000 to 100,000 rpm and more aptly between 25,000 and 45,000 rpm and even more aptly around 35,000 rpm. The thrust values may be around 30 to 50 pound of thrust (15 to 25 kg) per thruster 16. The thrust should be sufficient to propel the user, with net thrust possibly lower than the combined weight of the user and apparatus. In some situations it may be possible to increase the net thrust to a value greater than the combined weight of the user and apparatus.

The drive means requires a power source in order operably to cause movement of the air moving means 22. Where the drive means is an electric motor, the power source is conveniently a battery, or a battery pack. Other known portable sources of electric power are useable in principle, provided always that such sources can conveniently be carried by a user while engaging in paragliding or other such sport using the apparatus of the invention. A battery pack is illustrated schematically at 26 in FIGS. 1 and 2. As illustrated, the battery pack 26 is mounted on the outside of housing 18, but other locations may be possible, for example within the housing 18 (if the housing 18 is appropriately shaped) or within a hollow interior part of rigid member 12. The location of battery packs for the respective thrusters 16 (specifically for the drive means of the air moving means 22) is selected to ensure that the weight of the battery packs is evenly distributed with respect to the apparatus as a whole. It would be undesirable for one thruster 16 to appear to a user to be heavier than the other thruster 16.

Figure 7:
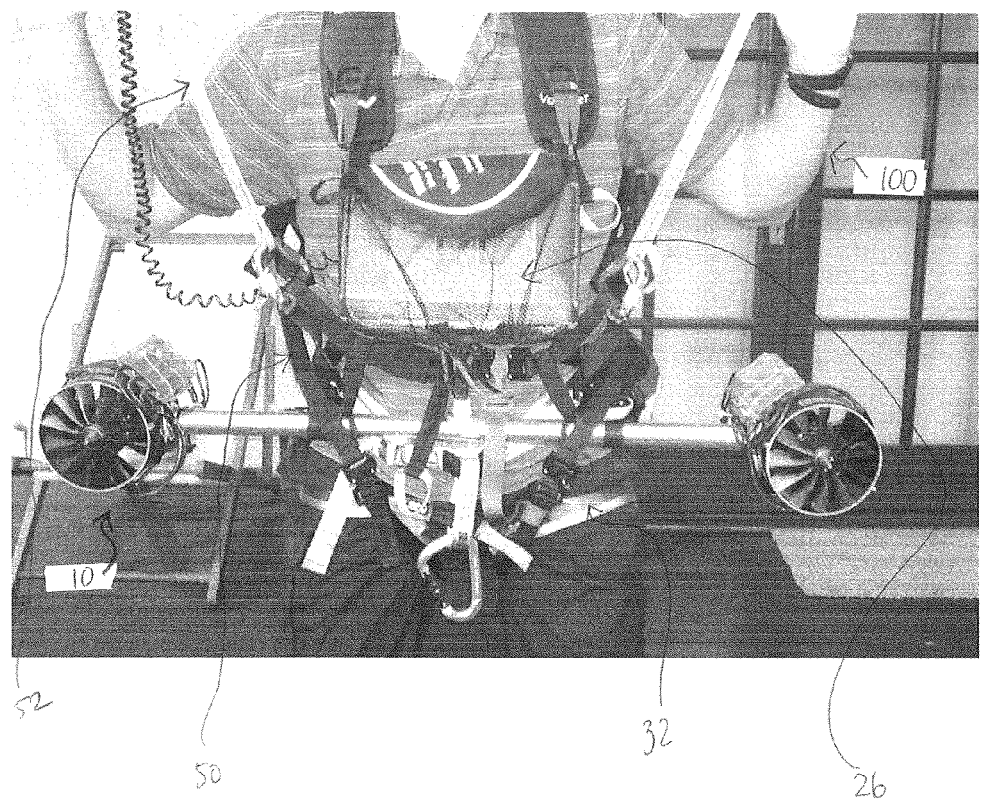
FIG. 7 is an image showing a user wearing an exemplary apparatus along with a paragliding harness.

In alternative arrangements, one or more battery packs 26 may be carried about the user's person, for example by means of a supporting harness, e.g. attachable around a user's neck as shown in FIG. 7, the battery pack 26 being connected to the electric motors by suitable electrical connectors, notably wires.

Typically, each of the thrusters may require in the region of 5 to 25 KW of energy, which may be delivered by a lithium polymer (LiPo) battery pack via an electronic speed controller to brushless motors with high magnetic fields. A fan with diameter of around 15 cm diameter turning at around 35,000 rpm using brushless motor and 14 cell LiPo battery of 5 AmpHour rating will produce about 12 kg of thrust. Current draw would be 150 Amps at 54 Volts (corresponding to about 8000 Watt power consumption).

The wind speed leaving the thruster 16 may be around 100 $ms^{-1}$ or more, which is higher than conventional propellers (that turn at a few thousand rpm). As such, the torque on the thruster shaft is very low compared to a conventional propeller, resulting in a higher degree of manoeuvrability of the apparatus and more predictable control, avoiding torque steer. Also, the high wind velocity output of each thruster ensures that thrust is not significantly reduced by motion of the apparatus as the speed differential is not as significant. As such, even under extreme speeds including freefall the apparatus remains manoeuvrable.

Referring now in particular to FIGS. 3 to 6, a user 100 is shown wearing an attachment element 32, which in this case is a harness secured around the user's waist and legs (in a similar manner to a rock climbing harness), and which harness is attached to the thruster apparatus 10. Having the harness around the user's waist and legs, or in the region of the hips in general, helps to allow the user to adopt various positions (in the air and on the ground) including where the user is bent at the hips, without the apparatus being substantially affected by the movement or user's body shape. It will be appreciated that instead of a harness as shown in the figures, alternatively a line, cord, wire, cable, strap or belt could be used as the attachment element that fits around the user's waist. In some configurations the attachment element 32 may be sufficiently robust to assist in conveying thrust from the apparatus 10 to a user's body, so allowing greater precision by the user in setting the orientation, attitude or alignment of the apparatus 10.

The apparatus 10 also includes a connector 34 which in this case is a looped strap connecting the harness to the rigid member 12. In some embodiments the connector could include a quick release system acting to prevent separation of the user and the apparatus but allowing separation in an emergency situation. Such means are, per se, well known in the art. In some embodiments the connector may be integral with the attachment element.

In some preferred embodiments, the apparatus 10 includes a control device 40 (FIG. 1b) for adjusting the speed (rpm) of the thrusters. This may be a hand held unit including a button or other user input means for allowing the user to specify the stopping and starting of the thrusters, and optionally also the increase or decrease in speed of the thrusters. The user input means may be mechanical or electronic, having a link, for example a wire, chord or wireless signal to the thrusters for signaling the speed change. When the control device is hand held, this helps the user to be able to keep his hands on the wires of the paragliding equipment to control the canopy 36, and at the same time control the thruster speed. Of course it is also possible to have the control device in other convenient areas for the user to reach.

In some preferred embodiments, the apparatus 10 includes another control device (42 FIG. 1b), in addition to or instead of the above-mentioned control device, for adjusting the angle of thrust of the thrusters relative to the user. This also may be a hand held unit including a button or other user input means for allowing the user to specify the direction of the thrusters. The user input means may be mechanical or electronic, having a link, for example a wire, chord or wireless signal to the thrusters for signalling the angle change. When the control device is hand held, this helps the user to be able to keep his hands on the wires of the paragliding equipment to control the canopy (fabric wing) 36, and at the same time control the thruster angle of direction. Of course it is also possible to have the control device in other convenient areas for the user to reach, or the user could manually change the angle of the thrusters by adjusting the rigid member 12 for example.

For example, initially, for a standing start, the thrusters should face forwards for take off. Then subsequent to take off, and during flight mode, a user is likely to adopt a sitting position in the paragliding harness. This change of body position of the user is likely to alter the angle of thrust that the thrusters provide. Therefore, the above-mentioned control device (thruster adjuster) may be useful for the user to maintain the direction of thrust required.

In an alternative embodiment, any kind of weighting element 38 (illustrated in FIG. 4) could be operably connected to the thrusters so as to influence the direction of thrust by use of gravity. This could be a weighted chain for example hanging from the thruster housing 18.

A user 100 wearing the apparatus 10 of the invention, along with a paragliding harness 50 and wires 52 is shown in FIG. 7. In use the user can attach the apparatus 10 to his body and then don the paragliding equipment in the known manner.

With the present invention, the attachment of the apparatus to the front area of a user's body enables a standard paragliding harness to be fitted over the apparatus without special adaptation to either part. Also, the apparatus positioned on the body lies out of the field of use of the standard paragliding equipment, and thus does not interfere with the wearing of the paragliding equipment or the functioning of the paragliding equipment.

Furthermore, as a safety aspect, it will be appreciated that providing a connecting part between the thrusters and the attachment element that is also forward of the user's body will allow the user to more easily reach for a quick release button for example in an emergency situation, which would be more difficult to do if the thrusters were mounted on the user's back as per prior art devices.

It will be appreciated that with the present invention, superior control and handling of the apparatus can be achieved compared to prior known devices. Furthermore, although the apparatus of the present invention may require a higher fan speed than some known devices, the apparatus will be lighter and have a profile with a smaller surface area than known devices. Thus, less drag will be encountered in use.

In addition, since the apparatus allows for more acute handling, with the direction of thrust being completely controllable, this can have further benefits in terms of safety as well as user enjoyment. For example, avoidance of obstacles or hazards is more easily achievable.

Furthermore, by swivelling the rigid member by 180°, for example, it is possible to reverse the direction of thrust and enable a controlled stop. In use in an airborne activity, it may be possible to use the apparatus to slow or arrest the decent of the user. Typically known parachutes, including backup parachutes, cannot operate in the height range of less than 100 m. The present invention could therefore be used as a short distance decelerator for reducing falling speed in an emergency situation.

Alternatively in other embodiments, the apparatus 10 may include a mechanism to prevent the thrusters from reaching an unwanted angle relative to the user. For example, a stopper element could be used to provide a maximum angle or a limited range of angles through which the thrusters can be rotated. This mechanism could be used to prevent, for example, reverse thrust when the thrusters are rotated through 180° for situations when this is not desirable. Optionally, the apparatus may also include a bypass mechanism to override the stopper element for use in emergency situations.

In certain embodiments, the apparatus 10 may include a quick release mechanism for use in emergency situations. For example, where the apparatus is tethered to the user's waist area, the quick release mechanism may include a means of lengthening the tether to a length such that the apparatus moves to around shoulder height of the user. Then, the user may hang onto the apparatus in a free fall deceleration manoeuvre. The user may use downward thrust to remain upright in a thrust decelerated fall.

It will also be appreciated that since the source of thrust is forward of the centre of mass of the moving body, this arrangement will be inherently more stable than having a thrust source behind the body. For example, in a crash situation, the human body is often thrown forward with a forward momentum. With known apparatus located behind the body, the apparatus could continue to push the body forward. With the present invention, the apparatus will thrust forward of the centre of mass and likely detach from the body. The invention could include a safety measure to ensure that the thrusters are automatically stopped upon detachment from a user.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

I claim:

1. Apparatus for propelling a user wearing paragliding equipment, comprising:
   at least one thruster for providing thrust in a predetermined direction; and
   an attachment element for attaching the at least one thruster to a user's body such that the thruster is secured against the front portion of the user's body,
   wherein the apparatus comprises two thrusters provided at opposed ends of a rigid member, and the thrusters are attached to the attachment element via the rigid member, and
   wherein the attachment element is arranged to provide attachment of the rigid member and the thrusters to the user's body at the level of the user's hips.

2. Apparatus as claimed in claim 1 further comprising at least one weighting element operably connected to each thruster for influencing the direction of thrust provided by each thruster.

3. A kit of parts comprising an apparatus as claimed in claim 1, a harness element and a fabric wing member.

4. A method of propelling a user over land or water, comprising providing an apparatus as claimed in claim 1, providing a harness and a fabric wing member, and causing the thrusters to move air to thereby propel the user.

5. Apparatus of claim 1 wherein the attachment element comprises a waist portion adapted to worn around the user's waist and a connector connected to the waist portion and to the rigid member.

6. A method of propelling a user over land or water, comprising providing an apparatus as claimed in claim 1, providing paragliding equipment and using the thrusters to propel oneself in the forward direction while wearing the paragliding equipment.

7. A method of propelling a user over land or water, comprising providing an apparatus as claimed in claim 1, supporting the rigid member and the thrusters at the level of the user's waist and activating the thrusters to propel the user.

8. Apparatus as claimed in claim 1 wherein the attachment element comprises a harness or belt.

9. Apparatus as claimed in claim 8 wherein the attachment element further comprises a connector for connecting the harness or belt to the rigid member.

10. Apparatus of claim 9 wherein the connector comprises a ring or looped strap and the rigid member extends through the ring or looped strap.

11. Apparatus of claim 10 wherein the ring or looped strap comprises two spaced apart rings or looped straps through which the rigid member extends.

12. Apparatus as claimed in claim 1 wherein each thruster comprises a housing and an air moving device mounted within the housing.

13. Apparatus of claim 12 wherein the air moving device comprises a propeller.

14. Apparatus as claimed in claim 1 further comprising a control device for adjusting the speed of each thruster.

15. Apparatus as claimed in claim 14 wherein the control device is a hand-held unit.

16. Apparatus as claimed in claim 15 wherein the control device comprises a user input means for the user to start, stop, increase and/or decrease the speed of each thruster.

17. Apparatus as claimed in claim 14, further comprising a further control device for adjusting an angle of thrust provided by each thruster.

18. Apparatus as claimed in claim 17 wherein the further control device is a hand-held unit.

19. Apparatus as claimed in claim 18 wherein the further control device comprises a further user input means for the user to change the angle of thrust of each thruster.

* * * * *